United States Patent [19]
Beckemeier et al.

[11] Patent Number: 5,200,486
[45] Date of Patent: Apr. 6, 1993

[54] PROCESS FOR SEPARATING VOLATILE COMPONENTS FROM REACTION MIXTURES OBTAINED THROUGH HIGH-PRESSURE POLYMERIZATION

[75] Inventors: Heinz Beckemeier; Heinz-Dieter Bühnen, both of Oberhausen; Herbert Mercamp, Dinslaken; Wilhelm Zoller, Oberhausen, all of Fed. Rep. of Germany

[73] Assignee: Hoechst Aktiengesellschaft, Fed. Rep. of Germany

[21] Appl. No.: 790,126

[22] Filed: Nov. 6, 1991

Related U.S. Application Data

[63] Continuation of Ser. No. 484,397, Feb. 23, 1990, abandoned.

[51] Int. Cl.⁵ ............................................. C08F 6/28
[52] U.S. Cl. .................................... 526/352; 528/483; 528/498
[58] Field of Search ................. 525/324; 528/483, 498; 526/352

[56] References Cited

U.S. PATENT DOCUMENTS

| | | | |
|---|---|---|---|
| 2,457,238 | 12/1948 | Hunter et al. | 528/483 |
| 3,372,154 | 3/1968 | Turner et al. | 528/498 |
| 3,719,643 | 3/1973 | Knight | 528/498 |
| 3,719,648 | 3/1973 | Frielink | 528/483 |
| 3,734,400 | 5/1973 | Pfeiffer et al. | 528/498 |
| 3,755,285 | 8/1973 | Piazza | 528/498 |
| 4,053,697 | 10/1977 | Asada et al. | 528/493 |
| 4,168,356 | 9/1979 | Levresse et al. | 528/498 |

Primary Examiner—Joseph L. Schofer
Assistant Examiner—Tom Weber
Attorney, Agent, or Firm—Jordan B. Bierman

[57] ABSTRACT

Separation of volatile components from the polymer melts formed during the homopolymerization of ethylene or the copolymerization of ethylene with other copolymerizable compounds at elevated pressures and elevated temperatures by countercurrent treatment with ethylene. Superior separations are obtained by the process.

15 Claims, 3 Drawing Sheets

PROCESS FOR SEPARATING VOLATILE COMPONENTS FROM REACTION MIXTURES OBTAINED THROUGH HIGH-PRESSURE POLYMERIZATION

This application is a continuation of application Ser. No. 07/484,397, filed Feb. 23, 1990, now abandoned.

The invention relates to a process for separating volatile components from polymer melts which are obtained from the polymerization of ethylene and the copolymerization of ethylene with other copolymerizable compounds under high pressure.

BACKGROUND OF THE INVENTION

The radical high-pressure polymerization of ethylene alone or together with comonomers is performed on a commercial scale in tubular reactors or in autoclaves with agitation at pressures of 50 to 400 MPa, in particular 140 to 250 MPa, and temperatures of 100° to 400° C.

A diagram of the process is shown in FIG. 1. Fresh ethylene is first fed into low-pressure compressor 8 via line 9, compressed to 10 to 35 MPa and then, together with the unreacted ethylene from the polymerization stage and which is recycled, it is raised to the reaction pressure in a high-pressure compressor 5. With the aid of suitable pumping equipment, e.g., piston pumps, the initiators present in solution are mixed into the compressed ethylene or metered into the reactor directly.

Comonomers such as vinyl esters, olefinically unsaturated carboxylic acids, or alpha-olefins are also fed into the high-pressure compressor 5 via feed line 10. In reactor 1 between 10 and 45% by weight of the monomers entering the reactor are reacted in one run. The polymer is precipitated in high-pressure separator 3 by reducing the pressure on the mixture to 5 to 50 MPa, preferably 10 to 35 MPa, after optional cooling in cooler 2. During pressure-relief, the gaseous components released are returned to the high-pressure compressor 5 via high-pressure return gas system 4. The polymer, which contains dissolved unreacted monomers, is pressure-relieved via a system consisting of low-pressure separator 6 and low-pressure cooler 7. The low-molecular weight compounds released are returned via the low-pressure compressor 8 to the high-pressure compressor 5. The polymer precipitated in the low-pressure separator 6 contains not only residual amounts of ethylene and comonomers but also oligomers.

Even when the polymerization products are separated carefully, it is impossible to avoid volatile admixtures such as comonomers, their decomposition products, and other low-molecular weight compounds being retained in the polymers. During storage and processing of the polymers, these residues lead to undesirable emissions and odors; in addition, the flame point of the polymers is considerable reduced. Therefore, efforts are made to insure that the products are free of volatile compounds by taking suitable measures during the pressure-relieving process and by subjecting the polymer to an additional treatment.

Further difficulties are caused by the fact that the ethylene liberated in the low-pressure separator contains comonomers, oligomers, and other compounds which condense out when the separated ethylene is recycled, forming deposits in the compressors and pumps which can lead to clogging.

According to a process described in DD-PS 131 824, either the reaction mixture is brought into contact intensively with the ethylene downstream of the polymerization reactor or the polymer melt is brought into contact intensively with the ethylene after separation of the majority of the unreacted gas mixture in a pressure stage and the mixture is then separated in a stabilizing zone. According to an appropriate embodiment of this process, the reaction mixture is fed countercurrently into a widening tube, ethylene also being simultaneously introduced and the mixture thus formed is separated in the low-pressure separator.

Another procedure for high-pressure polymerization of ethylene is disclosed in the DE-AS 21 31 145. It mixes the reaction mixture coming from the reaction zone with the fresh ethylene feed and the recycled ethylene coming from the low-pressure separator.

Both processes lead only to a slight reduction in the concentration of low-molecular weight admixtures in the polymer. Moreover, additional apparatus is required for their performance.

It is also known that unreacted gas originating from the low-pressure separator can be recycled to the high-pressure cycle with the aid of an injector (cf. DD-PS 202 882). However, this process does not reduce the concentration of the low-molecular components remaining in the product.

With liquid products, the low-molecular weight compounds can be separated by gas scrubbing with nitrogen or other inert gaseous substances. However, additional apparatus is also required for this process and the separated components cannot be returned without cleaning.

BRIEF DESCRIPTION OF THE INVENTION

Therefore, the problem was to develop a process which avoids the disadvantages described above, guarantees nearly complete removal of the volatile components from the polymer melt, and insures that little or no condensed components are contained in the cycle gas of the low-pressure stage.

The invention consists in a process for separating volatile components from polymer melts formed during the homopolymerization of ethylene or the copolymerization of ethylene with other copolymerizable compounds at elevated pressures and elevated temperatures. It is characterized in that ethylene is passed in countercurrent flow through the melt at pressures of 5 to 70 MPa and a temperature in the melt of at least approximately 120° C.

Surprisingly, with the new process it is possible to almost completely remove the volatile components contained in the polymer melt formed during high-pressure polymerization. Further cleaning, e.g. in the extruder or during storage of the product, is not necessary. The concentration of the low-molecular components in the recycled ethylene is reduced until condensation products do not form during the compression of the ethylene and product losses are avoided.

The claimed procedure can be performed with different polymerizations and copolymerizations of ethylene using the high-pressure process, in both tubular reactors and autoclaves. It can be used both with solvent and solvent-free processes, and also with processes for the preparation of linear low-density polyethylenes (LLDPE).

Volatile components contained in the polymer melt are understood to be low-molecular weight compounds which are contained in the polymerization products, e.g. as comonomers, decomposition products of comonomers, and oligomers. Thus, for example, in the preparation of copolymers of ethylene and vinyl acetate, acetic acid formed by the decomposition of vinyl acetate is to be found in the products. Furthermore, volatile compounds include solvents which, for example, enter the reaction mixture with initiators and molecular mass regulators. Lubricants and other auxiliaries, which are required to operate the polymerization plant, also are present in the polymer melt.

According to the claimed process, the polymer melt is treated at elevated pressure, preferably at 5 to 70 MPa and in particular at 10 to 40 MPa. It is not necessary to provide a separate reactor for treatment; it can be successfully performed in the polymer separator of a high-pressure polymerization plant. It is expedient to remove most of the unreacted gas mixture by reducing the pressure to the above-mentioned range and then bringing the melt into contact with the ethylene. The high-pressure separator used in the polymerization process is particularly suitable for this purpose.

To insure that the volatile components are separated either completely or nearly completely from the melt, it is necessary to maintain a temperature of at least 120° C. therein. It has proved particularly valuable to treat the ethylene at temperatures above approximately 150° C. The higher the temperature, the more completely the volatile substances are separated. The only upper limit for the treatment temperature is the temperature at which the melt from the polymerization enters the chamber where the volatile substances are separated.

In order to guarantee as high a temperature as possible in the melt, it is expedient to pass heated ethylene in countercurrent flow to the melt. It is important to the claimed procedure that the ethylene and melt flow in opposing directions when they meet each other. This insures an extremely intimate mixture of melt and olefin.

The effectiveness of the ethylene stream can be further increased by forcefully diverting it from a straight path in the chamber where the melt is treated. In this manner, fresh ethylene is passed several times through the precipitated product. The ethylene is diverted by means of suitable installations in the reactor, in the simplest case by plates which are located on opposite sides thereof and in staggered formation.

The amount of ethylene required for treating the polymer melt depends on the temperature, the viscosity, and the comonomer content of the melt. The required amount of ethylene increases with the viscosity and the comonomer content and decreases with increasing temperature. In general, 0.1 to 2 parts by weight of ethylene are used per one part by weight of melt.

Pure ethylene can be used to separate the volatile components from the melt. It is compressed in the low-pressure compressor and fed into the polymer melt in the high-pressure separator. The ethylene charged with the volatile components of the melt is passed through the high-pressure gas system and then, after separation of the volatile components, is fed via a partial stream to the inlet side of the high pressure compressor and on into the polymerization reactor.

BRIEF DESCRIPTION OF THE DRAWINGS

In the accompanying drawings, constituting a part hereof and in which like reference characters indicate like parts.

DETAILED DESCRIPTION OF THE INVENTION

Figure 1:
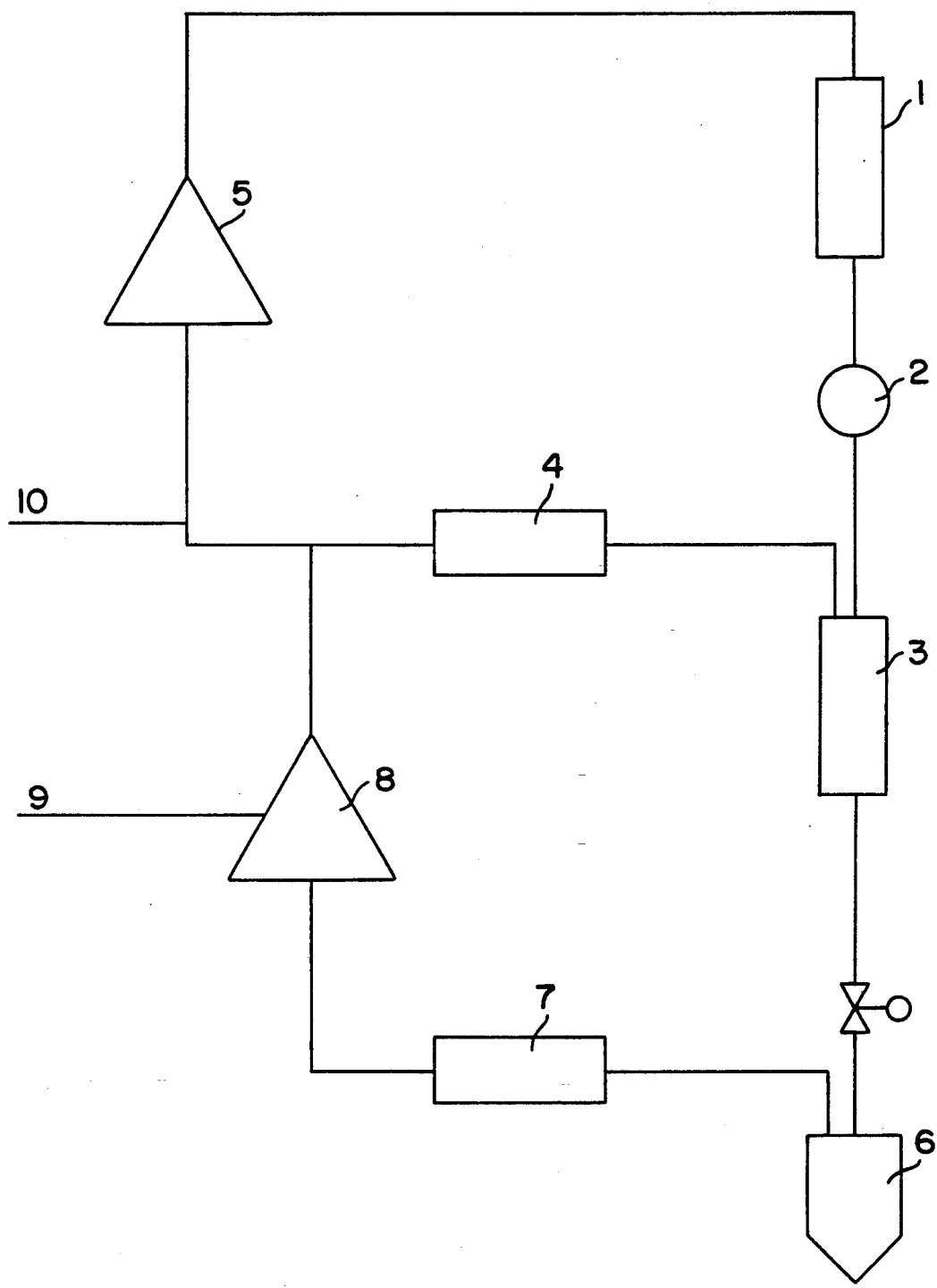
FIG. 1 is a flow diagram of a prior art process.
Figure 2:
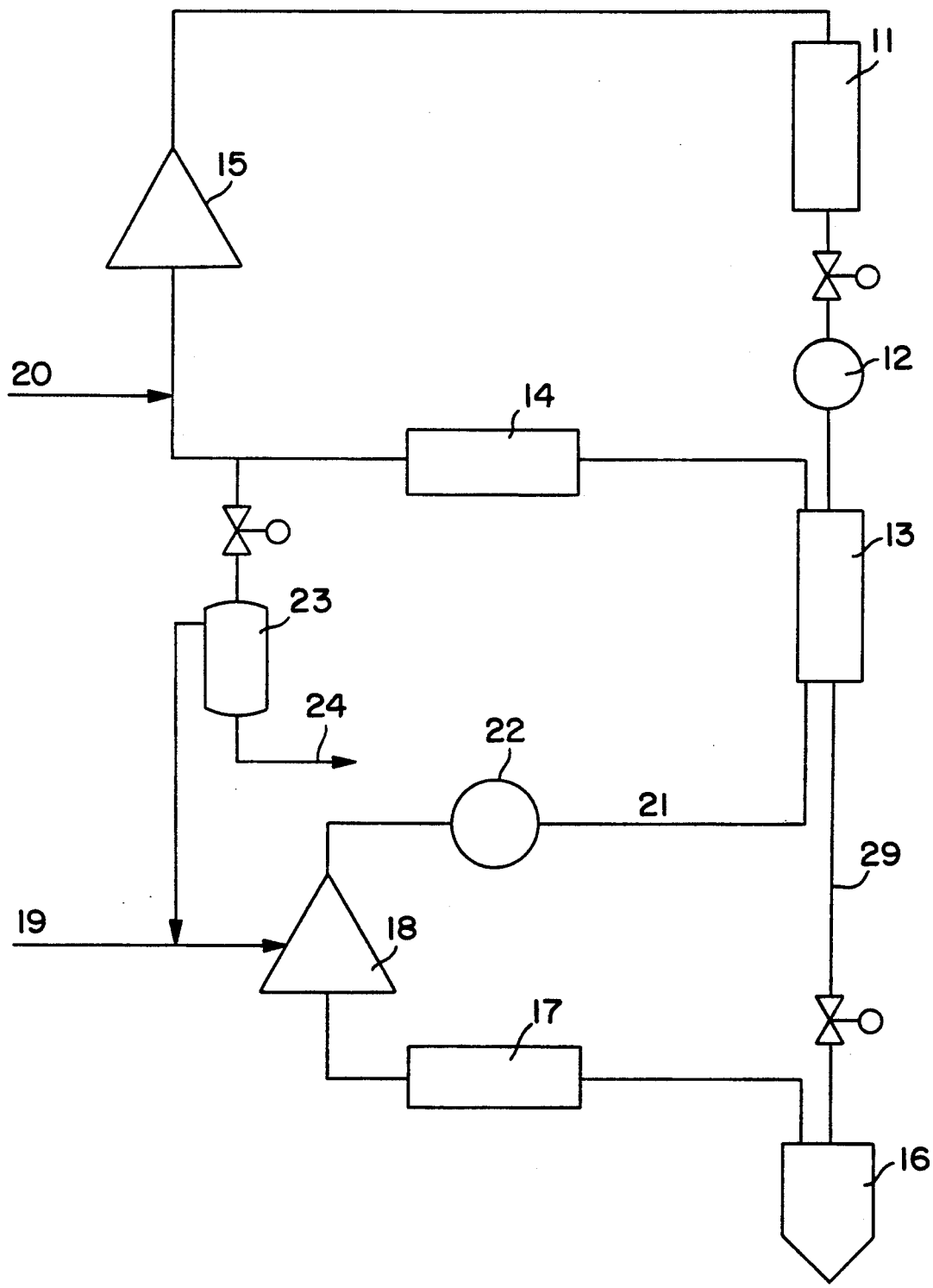
FIG. 2 is a flow diagram of the process of the present invention.

A diagram of the claimed process is shown in FIG. 2. Fresh ethylene from pipe 19 is compressed in low-pressure compressor 18 to 10 to 35 MPa, heated in heating device 22 to at least 120° C. and passed through line 21 into high-pressure separator 13. There it meets the polymer flowing in the countercurrent direction.

Charged with volatile, low-molecular weight components of the polymer melt, the ethylene enters a high-pressure gas recycling system. The low molecular components such as solvent, lubrication oil, and oligomers are separated by means of pressure-relieving device 23 and line 24. The ethylene, optionally containing comonomers which can be replenished via line 20, is fed to high-pressure compressor 15 and then to reactor 11. The polymer is separated at a pressure of 5 to 70 MPa in high-pressure separator 13, after it has been cooled in cooler 12, if necessary. The gaseous parts enter high-pressure gas recycling system 14 together with the fresh ethylene passed in the countercurrent direction. The polymer is pressure-relieved via low-pressure separator 16 and low-pressure cooler 17; the liberated low-molecular weight compounds are compressed in the low-pressure compressor together with fresh ethylene from line 19.

Figure 3:
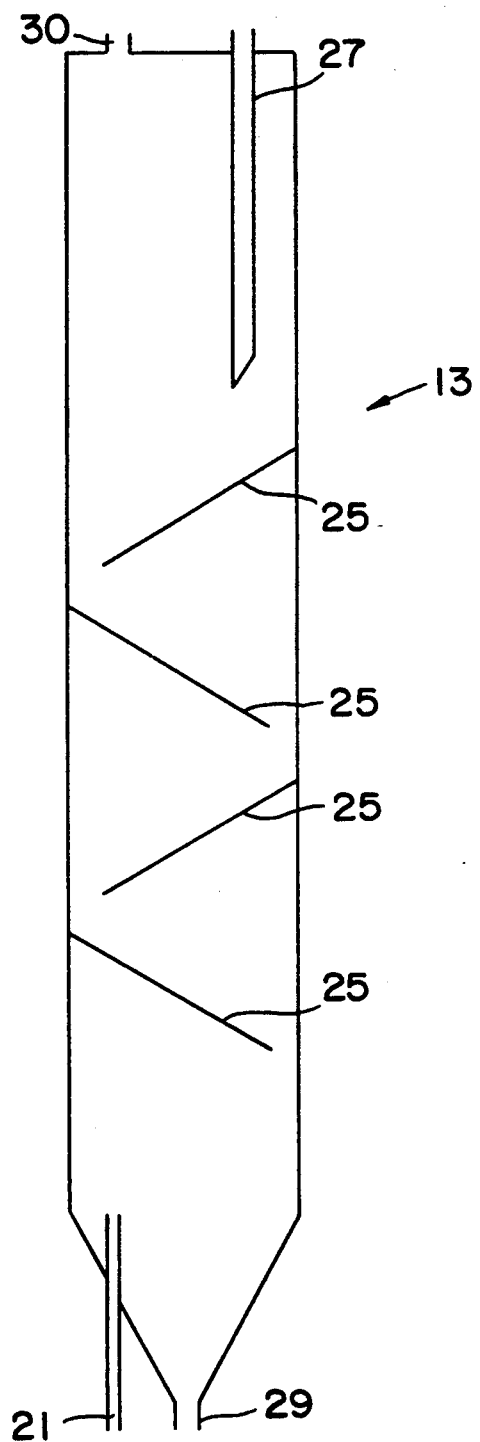
FIG. 3 is a schematic view of the high pressure separator of the present invention.

FIG. 3 shows separator 13 with baffles 25 where the polymer is treated with ethylene. The melt enters into the separator through line 27 and the ethylene through line 21. The melt leaves the separator through line 29 and the ethylene charged with volatile components from the melt through line 30.

The new process is explained in the following examples which are intended to be illustrative, not limitative.

EXAMPLE 1

A reaction mixture obtained from the polymerization of 720 parts by weight of ethylene and 280 parts by weight of vinyl acetate, and which has a percentage of 32.9% by weight of polymer, is fed into a high-pressure separator without baffles. The polymer is precipitated and can be drawn off via a bottom valve. Countercurrent to the polymer, 250 parts of ethylene are introduced and withdrawn from the head together with the low-molecular weight components of the melt. The treated polymer contains 0.62% by weight of monomeric vinyl acetate, and the vinyl acetate concentration of the low-pressure gas cycle is 12.5% by volume.

EXAMPLE 2

Comparison

The same procedure as in Example 1 is carried out, except that the ethylene is not fed into the high-pressure separator but is passed directly to the high-pressure compressor in known manner. The polymer contains 2% by weight of monomeric vinyl acetate, and the vinyl acetate concentration in the low-pressure gas cycle is more than 40% by volume.

EXAMPLE 3

A reaction mixture obtained from the polymerization of 720 parts by weight of ethylene and 280 parts by weight of vinyl acetate, and which has a percentage of 33% by weight of polymer, is fed into a high-pressure separator with baffles according to FIG. 3. The polymer is precipitated and can be drawn off via the bottom valve.

Countercurrent to the polymer, 260 parts of ethylene are introduced and withdrawn from the head together with low-molecular weight components of the melt. The treated polymer contains 0.33% by weight of monomeric vinyl acetate, and the vinyl acetate concentration in the low-pressure gas cycle is 4.4% by volume.

EXAMPLE 4

Comparison

The procedure of Example 3 is followed except that the ethylene is not fed into the high-pressure separator, but is passed directly to the high-pressure compressor in known manner. The polymer contains 1.1% by weight of vinyl acetate, and the vinyl acetate concentration in the low-pressure gas cycle is 33% by volume.

The viscosity of the polymers prepared according to Examples 1 to 4 is the same and is 250 mPa × sec at 140° C.

What we claim is:

1. The process for the separation of volatile components from polymer melts formed during the homopolymerization of ethylene or the copolymerization of ethylene with other copolymerizable compounds at elevated pressures and elevated temperatures, wherein a ratio of ethylene is passed countercurrently to said melts at a separation pressure of about 5 to about 70 MPa and a melt temperature of at least about 120° C.

2. The process of claim 1 wherein said pressure is about 10 to about 40 MPa.

3. The process of claim 1 wherein said separation takes place in a polymer separator of a high-pressure polymerization plant.

4. The process of claim 1 wherein said homopolymerization or said copolymerization is carried out at a polymerization pressure of about 50 to 400 MPa and said polymerization pressure is thereafter reduced to said separation pressure of about 5 to 70 MPa before said ethylene contacts said melt, whereby a portion of unreacted gas mixture present is removed from said melt.

5. The process of claim 4 wherein said portion is a majority of said mixture.

6. The process of claim 4 wherein said separation pressure is about 10 to 40 MPa.

7. The process of claim 1 wherein said melt temperatures are above about 150° C.

8. The process of claim 4 wherein said polymerization pressure is 140 to 250 MPa.

9. The process of claim 1 wherein said melts are cooled after said homopolymerization or said copolymerization and before said polymerization pressure is reduced.

10. The process of claim 1 wherein said ratio is 0.1 to 2.0 parts by weight of said ethylene to 1 part by weight of said melt.

11. The process of claim 3 wherein flows of said ethylene and said melt are diverted from a direct path.

12. The process of claim 11 wherein said flows are diverted by means of at least one impediment to direct flow located in said separator.

13. The process of claim 12 wherein said impediment is at least one baffle.

14. The process of claim 13 wherein there are a plurality of said baffles located on opposite sides of said separator.

15. The process of claim 14 wherein said baffles are staggered.

* * * * *